(12) United States Patent
Zakaras et al.

(10) Patent No.: US 8,647,542 B2
(45) Date of Patent: Feb. 11, 2014

(54) METHOD OF FORMING A REBATE IN A SURFACE OF A SLIP FORM CAST CORE USING A REBATE FORM WITH FERRULE SUPPORT

(75) Inventors: Justin Vyt Zakaras, Victoria (AU); Barry William Crone, Victoria (AU); Robert Urquhart Connell, Victoria (AU)

(73) Assignee: ITW Construction Products Australia Pty Ltd, Victoria (AU)

(*) Notice: Subject to any disclaimer, the term of this patent is extended or adjusted under 35 U.S.C. 154(b) by 1607 days.

(21) Appl. No.: 11/557,400

(22) Filed: Nov. 7, 2006

(65) Prior Publication Data
US 2007/0189707 A1 Aug. 16, 2007

(30) Foreign Application Priority Data
Nov. 8, 2005 (AU) .................. 2005906197

(51) Int. Cl.
*E04G 21/12* (2006.01)
*E04G 15/04* (2006.01)

(52) U.S. Cl.
CPC ............... *E04G 21/12* (2013.01); *E04G 15/04* (2013.01)

USPC .............................................. 264/35; 249/83

(58) Field of Classification Search
USPC ............... 249/83, 85, 96, 97; 264/31, 32, 35; 425/63
See application file for complete search history.

(56) References Cited

U.S. PATENT DOCUMENTS

| | | | | |
|---|---|---|---|---|
| 2,623,261 A | * | 12/1952 | Semeraro | 249/183 |
| 3,429,547 A | * | 2/1969 | Schimmel | 249/192 |
| 3,982,363 A | * | 9/1976 | Dorris | 249/96 |
| 6,367,219 B1 | * | 4/2002 | Quinlan | 52/506.06 |
| 2006/0075706 A1 | * | 4/2006 | Boxall et al. | 52/414 |

* cited by examiner

*Primary Examiner* — Michael Safavi
(74) *Attorney, Agent, or Firm* — Lowe Hauptman & Ham LLP (57) ABSTRACT

A formwork system for use in slip form casting central cores of high rise buildings provides a rebate form for a rebate at the level of each floor slab which is subsequently to be cast. The rebate form is designed to carry ferrules to be cast into the core at the level of the rebate to provide anchoring points for incorporation of reinforcement associated with the floor slab. The ferrules are carried from the rebate form via plugs which are stripped from the ferrules after casting when the rebate form and main slip form to which it is attached is withdrawn.

19 Claims, 7 Drawing Sheets

METHOD OF FORMING A REBATE IN A SURFACE OF A SLIP FORM CAST CORE USING A REBATE FORM WITH FERRULE SUPPORT

RELATED APPLICATIONS

The present application is based on, and claims priority from, Australian Application Number 2005906197, filed Nov. 8, 2005, the disclosure of which is hereby incorporated by reference herein in its entirety.

BACKGROUND OF THE INVENTION

1) Field of the Invention

The present invention relates to a formwork system for use in slip form casting central cores of high rise buildings.

2) Description of the Prior Art

As is well known in the construction industry, the central core of a high rise building is conventionally constructed by a slip form casting process by which successive stages of the core are formed, typically with each stage corresponding to one story of the building. The central core forms the principal structure of the building from which the individual floors are cantilever mounted. It typically acts as the structure for containing lifts, fire escape stairs, and service ducts.

When each story is cast, it is conventional to form along the outer side of the core a rebate into which will be cast the inner end of a floor slab at that level. The rebate is defined by a form of appropriate cross-section attached to the inside face of the main formwork. With the existing system, accommodation has to be made for reinforcement which needs to extend from the core at the level of the rebate in order to subsequently tie into the reinforcement for the cast floor slab. Principally, the reinforcement is cast into the core, but because of the presence of the main formwork and rebate form during casting, the part of the reinforcement which is to project from the core needs to be bent to lie along the interior of the rebate form. For this purpose, the rebate form is of hollow or box-like construction so as to receive the bent lengths of reinforcement. The actions of bending the reinforcement to set the reinforcement into the interior of the rebate form for casting and then subsequently straightening the reinforcement after casting to permit stripping of the reinforcement from the rebate form and to set lie reinforcement in the correct configuration for use, are quite time-consuming. Moreover the bending and subsequent straightening can lead to reduced ductility of the reinforcement which is undesirable and difficulties are sometimes encountered in ensuring that the ductility remains within prescribed limits.

SUMMARY OF THE INVENTION

The present invention relates to a formwork system for forming the rebate and also for carrying ferrules to be cast into the core to provide anchoring points into which reinforcement can be installed after casting the core thereby obviating the need for any bending and straightening of the reinforcement.

According to the present invention there is provided a formwork system for forming a rebate in the face of a core produced by slip form casting, said system comprising a rebate form attachable to the inside face of a slip form, and at least one ferrule support carried by the rebate form, the ferrule support serving, in use of the system, to locate the ferrule within the core so that the ferrule can be cast into the core and, after casting, withdrawal of the slip form and rebate form from the core will remove the ferrule support from the ferrule thereby exposing the outer end of the ferrule which opens onto the rebate to receive reinforcing bar or other fastening means.

In a preferred embodiment of the invention, the rebate form. has provision for mounting the or each ferrule support at selected positions along the length of the form. This may be achieved by providing a series of spaced passages opening to the inner face of the form and into which the ferrule support can be releasably engaged. Closure plugs can be applied to those passages which are not in use.

Preferably the rebate form is of modular construction enabling a rebate of required length to be produced by assembling two or more such modules in end-to-end relation. Preferably each module has end fittings designed for interlocking engagement with the end fittings of adjacent like modules to provide a smooth transition between adjacent modules when connected.

Preferably the ferrule support is in the form of a finger which projects from the inner face of the rebate form to engage within the interior passage of the ferrule to provide support for the ferrule along a substantial part of the length of the passage and also to close the outer end of the passage against entry of concrete during casting. The support finger is a push fit within the ferrule to retain the ferrule during casting while being able to be withdrawn from the ferrule when the slip form is withdrawn. Preferably the ferrule support is configured to retain the outer end of the ferrule substantially flush with the inner face of the rebate form.

In a modification, instead of attaching the rebate form to the inside of a slip form, the rebate form can be attached to reinforcement to permit the rebate form to be withdrawn after the slip form has been withdrawn. Although it is preferred that the rebate form is designed in such a way that the same rebate form is suitable for either mode of usage, nevertheless in principle it would be feasible to design a rebate form just for usage by being tied to reinforcement.

Accordingly, a further aspect of the present invention provides a formwork system for forming a rebate in the face of a core produced by slip form casting, said system comprising a rebate form attachable relative to reinforcement, and at least one ferrule support carried by the rebate form, the ferrule support serving, in use of the system, to locate the ferrule within the core so that the female can be cast into the core and, after casting, withdrawal of the rebate form from the core will remove the ferrule support from the ferrule thereby exposing the outer end of the ferrule which opens into the rebate to receive reinforcing bar or other fastening means.

The present invention also provides a method of forming a rebate in the surface of a slip cast core with cast-in ferrules opening into the rebate for receiving reinforcing rod or other fastening means, by use of a rebate form attached to the slip form or reinforcement, with ferrule supports carried by the rebate form.

A ferrule support of the form described above also has significant utility for use in other casting situations with the head of the support being designed for attachment directly to the face of formwork, such as by mailing or by adhesive.

Accordingly a yet further aspect of the present invention provides a ferrule support having a head for attachment to formwork and a ferrule support finger which projects from the head to engage within the interior passage of a ferrule to provide support for the ferrule along a substantial part of the length of the passage and also to close the outer end of the passage against entry of concrete during casting, the support finger being a push fit within the ferrule to retain the ferrule during casting.

Advantageously, the part of the support finger immediately adjacent the head is sized to be a firm push fit within the outer end of the ferrule passage so as to engage and seal the end of the passage and the remainder of the finger is of a form which engages the internal surface of the ferrule passage along substantially its entire length without providing significant resistance to insertion or removal of the finger into and out of the ferrule.

BRIEF DESCRIPTION OF THE DRAWINGS

An embodiment of the invention will now be described by way of example only with reference to the accompanying drawings in which.

DESCRIPTION OF THE PREFERRED EMBODIMENTS

Figure 4:
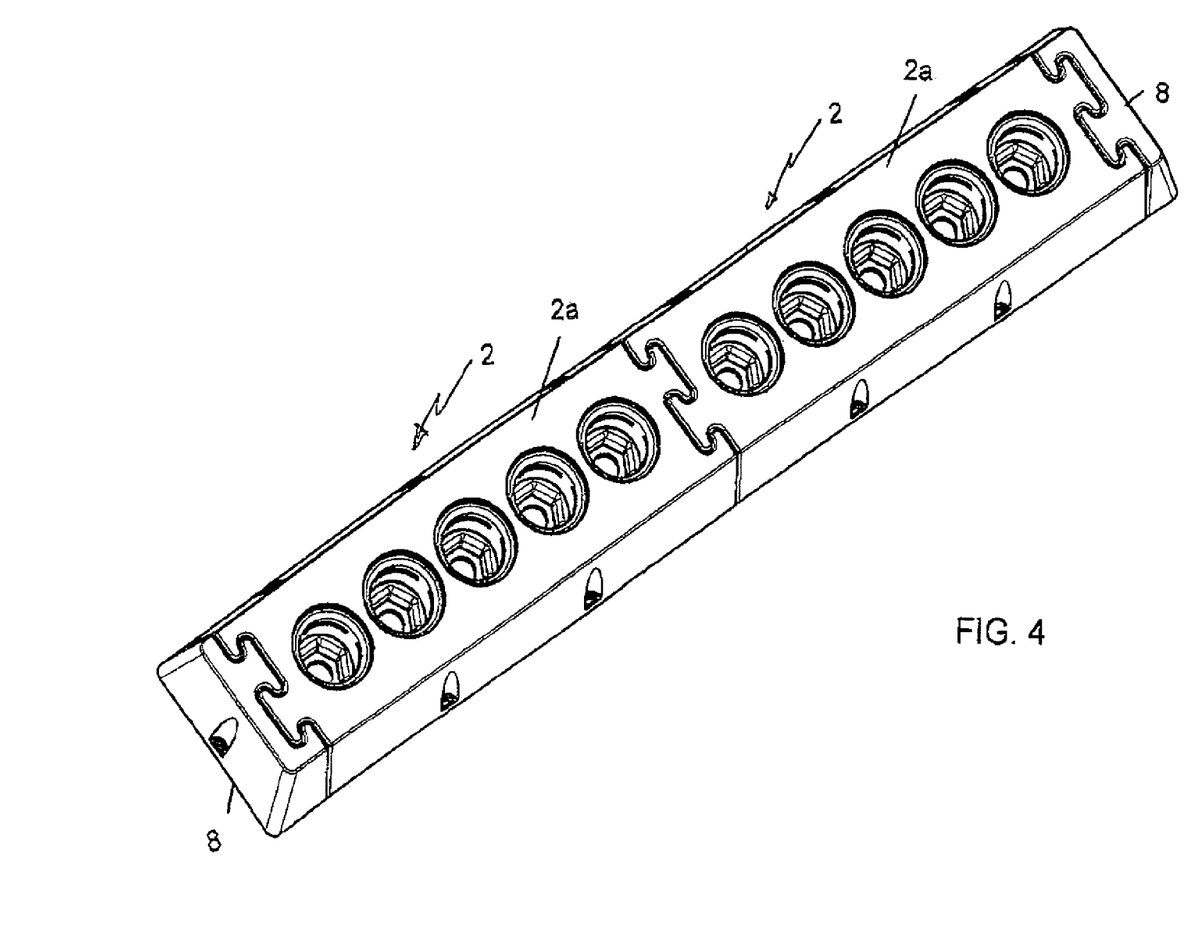
FIG. 4 shows two modules assembled in end-to-end relation with end caps fitted at each end of the assembly.

The preferred embodiment of the invention provides a modular system for forming the rebate and also for locating in the core cast-n ferrules which open onto the base of the rebate for subsequent fitting of reinforcing bars. As illustrated in the drawings, the system comprises a formwork module 2 of appropriate cross-section to define the rebate during casting. Each end of the module 2 is formed with complementary male and female end fittings 4, 6 to enable a series of modules to be interlocked in end-to-end relation to produce a rebate form of required length, with a smooth transition between adjacent modules (see FIG. 4 which shows just two interlocked modules). An end cap 8 is applied to the end fittings at the two opposite ends of the assembled modules to provide the required end shaping for the overall form.

The module 2 is formed along its length with a series of regularly spaced passages 10 extending from the front or inner face 2a of the module to the rear of the module. Each passage 10 is of stepped shape and principally consists of a section of threaded form opening onto the inner face 2a followed by a section of somewhat reduced diameter opening onto the rear. The smaller diameter section serves to receive a fastener inserted into the passage from its inner side for fastening the module to the front face of the slip form, with the head of the fastener being located rearwardly beyond the threaded section. The module is also provided with holes 12 along its outer edges for attaching the module to the reinforcement with wire instead of fixing to the slip form which may be desirable in some situations. The threaded section of each passage 10 opens onto the inner face 2a of the module via an annular recess 10a of a depth to receive a disc-like head of a ferrule support plug 16 (FIG. 5) or a closure plug 18 (FIG. 6) screwed into the passage so that the head is flush mounted within the inner face of the ferrule.

Figure 5:
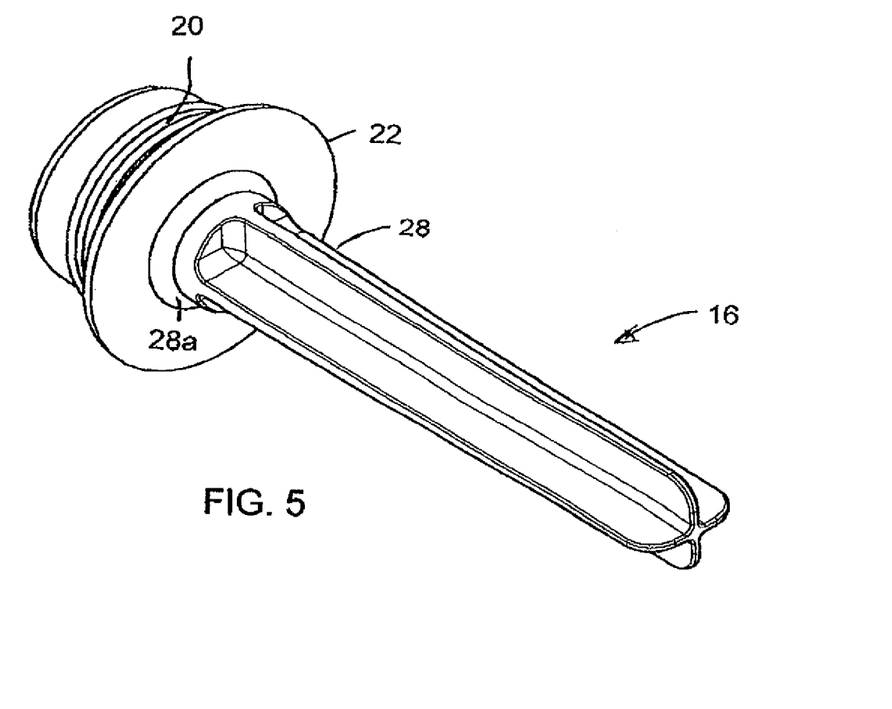
FIG. 5 shows a ferrule support plug for application to the module.

As shown in FIG. 5, the ferrule support plug 16 has at its outer end a threaded boss 20 designed to fit into the threaded section of the passage 10, the boss 20 projecting rearwardly from a disc-like head 22 so that when the boss 20 is fully engaged with the thread in the passage 10, the head 22 will be seated within the recess 10a flush with the inner face 2a of the module. The cast-in ferrule with which the ferrule support plug 16 is designed for use is of conventional form and has an internally threaded passage which opens to the outer end of the ferrule. A ferrule support finger 28 projects forwardly front the forward face of the head 22. The part 28a of the support finger 28 immediately adjacent the head 22 is sized to be a firm push fit within the outer end of the ferrule passage so as to engage and seal the end of the passage. The remainder of the finger is of a cross-section, as shown a cruciform section, which engages the internal surface of the ferrule passage along substantially its entire length to provide support for the ferrule but without providing significant resistance to insertion or removal of the finger into and out of the ferrule.

A range of different ferrule support plugs can be produced with ferrule support fingers of different size for use with a range of different diameters of ferrule.

Figure 6:
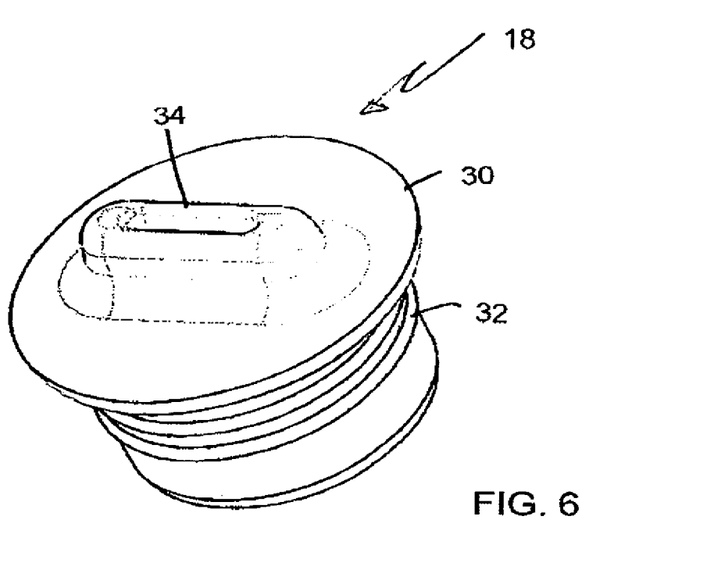
FIG. 6 shows a closure plug for application to the module.

The incorporation of the several passages 10 along the length of the module 2 provides versatility in the number of, and spacing of, ferrules which can be carried by the module, particularly within the context of two or more modules interconnected to form the rebate form. Those passages 10 which are not used to carry a ferrule support plug 22 are closed by a closure plug 18 which is screwed into the threaded end of the passage 10 so that a disc 30 which forms the head of the plug sits flush within the annular recess 10a and thereby prevents concrete from entering the passage 10 during casting. The detailed structure of the closure plug is shown in FIG. 6 from which it will be seen that the disc 30 has on its rear face a threaded boss 32 similar to that of the ferrule support plug. The forward face of the disc 30 is substantially plain apart from a slotted projection 34 which enables the plug to be screwed into the passage 10 either by hand or by a screwdriver.

In use, the rebate form is assembled to the forward face of the slip form using the required number of modules 2. Ferrule support plugs 16 are screwed into the required passages 10 of the module(s) and the remaining passages 10 are sealed by the closure plugs 18. Ferrules are pushed onto the support plugs 16 to be supported thereby, with the outer end of each ferrule abutting firmly against the forward face of the disc 22 and thereby substantially flush with the forward face of the rebate form. The ferrules can be then "tied" into the reinforcement for that stage of the central core as appropriate. Following casting of the stage of the core, the slip form is withdrawn from the core. For the outer form which carries the rebate formwork that withdrawal movement is an outwards movement perpendicular to the outer face of the core. As a result of that outwards movement, the support fingers 28 of the ferrule support plugs 16 will be withdrawn axially from the internal threaded passages of the ferrules which are now embedded within the central core, thereby exposing the outer ends of the ferrules which open onto the base of the rebates. The rebate module(s) 2 and associated plugs 16, 18 can remain in position on the slip form when advanced to the next stage and the process is again repeated. The exposed ends of the cast-in ferrules can now accept lengths of reinforcing bar or other fasteners screwed into the ferrules to tie into reinforcement for the floor slab subsequently to be cast at the level of the rebate.

By use of this formwork system, at each casting stage the ferrules are quickly and easily mountable on the support plugs, and following casting the support plugs are stripped from the ferrules when the slip form is withdrawn thereby exposing the open ends of the ferrules as part of the same action. Reinforcing bars can subsequently be screwed into the ferrules to project from the rebate. This procedure avoids the need to bend and then subsequently straighten the reinforcement and thereby avoids the problems of reduced ductility of the reinforcement which results from those actions.

Although the rebate form is principally designed to be attached to the slip form so that it will be withdrawn when the slip form is withdrawn, as previously mentioned in some situations the rebate form will be tied to the reinforcement rather than the slip form and in that case the rebate form will be withdrawn manually after the slip form has been withdrawn.

By producing the system in modular form, substantial versatility as to the length of the rebate form and placement of reinforcement can be achieved without the need to manufacture the system with components in a range of different sizes. If required, modules can be attached to the slip form in side-by-side relation to form a rebate of increased depth.

The modules, end fittings, and plugs can all be produced as robust plastic mouldings and are capable of repeated reuse.

Figure 1:
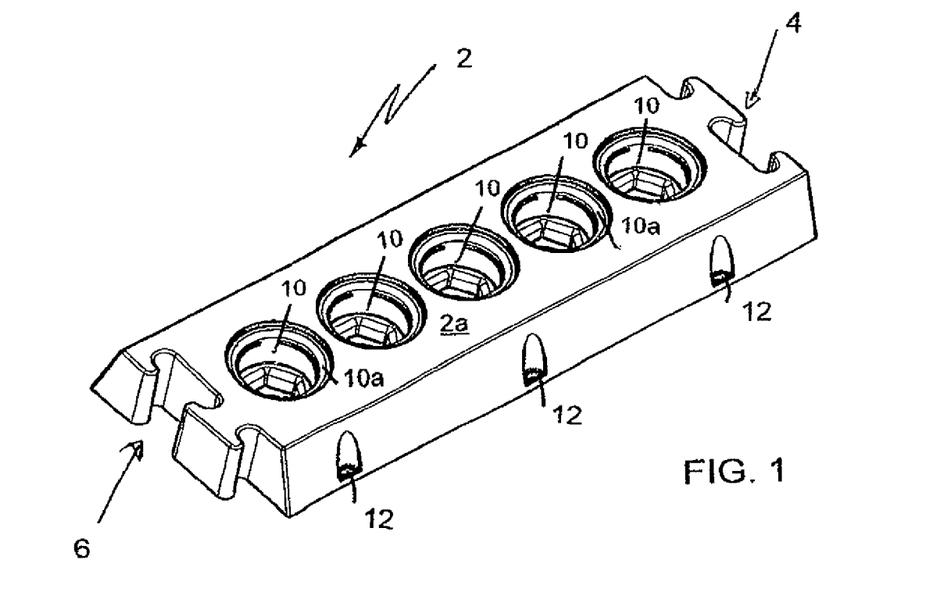
FIG. 1 is a view from the front of a formwork module of a rebate formwork system in accordance with an embodiment of the invention.
Figure 2:
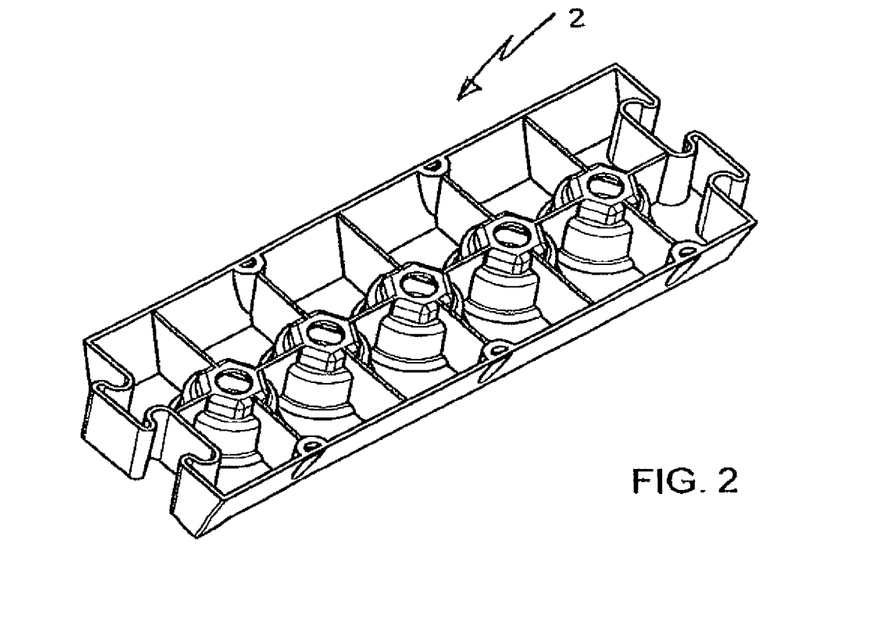
FIG. 2 is a rear view of the module.
Figure 3:
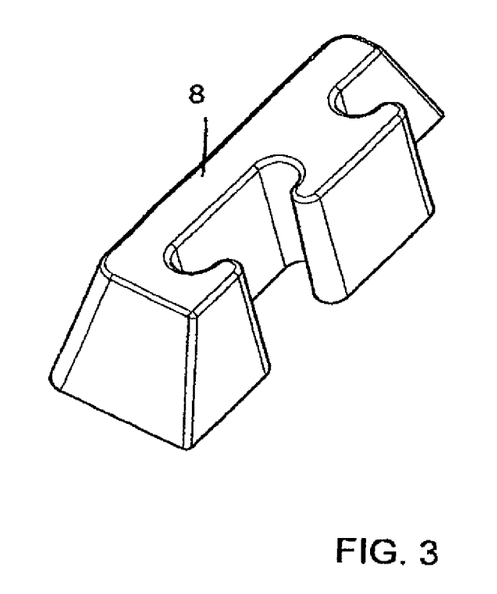
FIG. 3 shows an end cap for the module.
Figure 7:
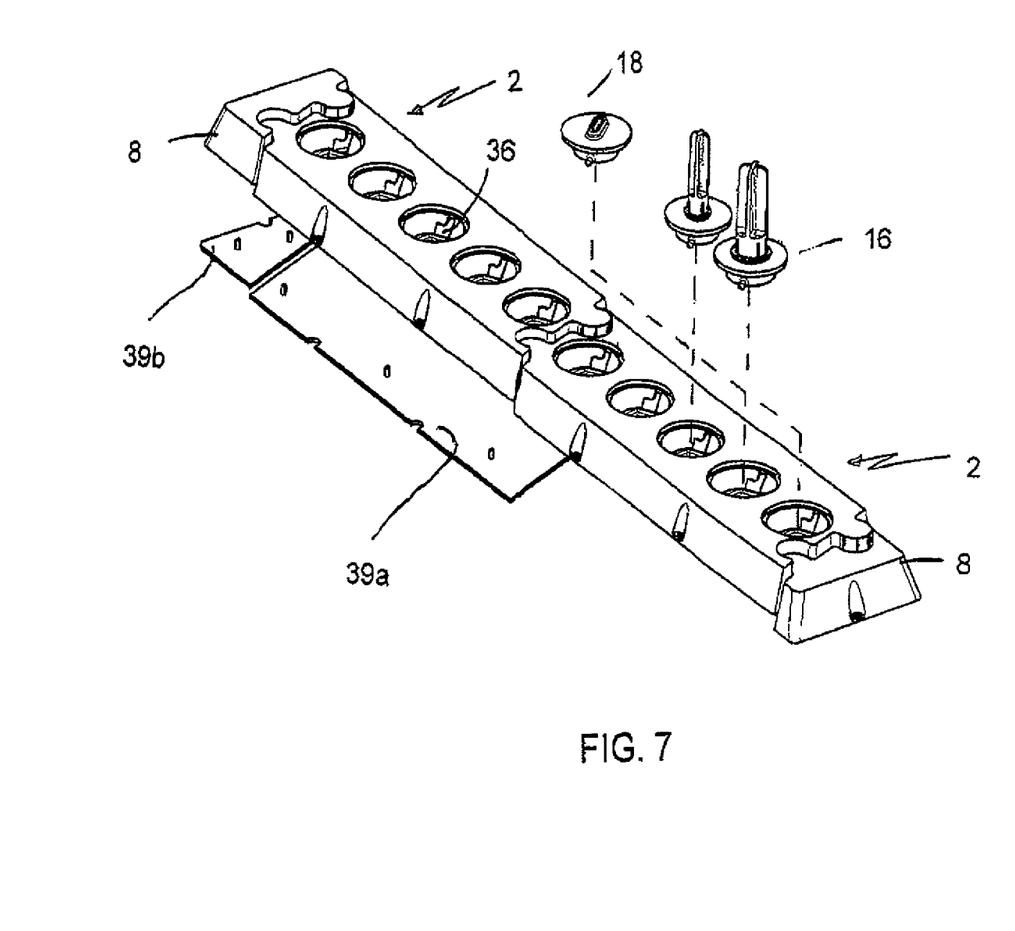
FIG. 7 is a view similar to FIG. 4 but showing a modified version of the formwork module.
Figure 8:
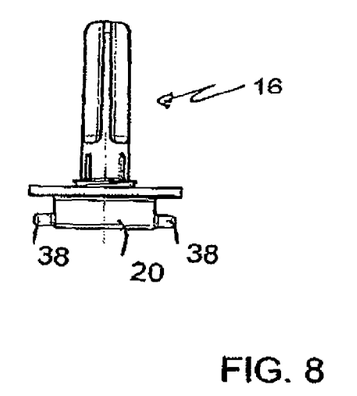
FIG. 8 is a side view of a ferrule support plug for application to the module of FIG. 7.
Figure 9:
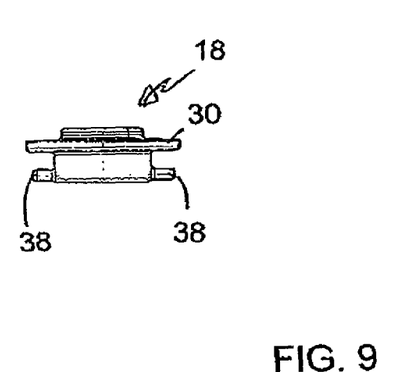
FIG. 9 is a side view of a closure plug for application to the module of FIG. 7.

In the module shown in FIGS. 1 and 2, the design of the end fittings 4, 6 leads to an increased spacing between the adjacent end passages 10 of two adjacent modules when interlocked. This can be seen with reference to FIG. 4 from which it will be observed that the distance between the adjacent passages 10 in each module is less than the spacing between the two passages 10 at either side of the zone of intersection of the two modules. FIG. 7 shows a module in which the end fittings are re-configured so that when adjacent modules are interlocked as shown, the same passage spacing will be attained along the entire length of the series of two or more interlocked modules. The module shown in FIG. 7 also differs from that shown in FIGS. 1 and 2 in that its passages 10 are designed to receive the ferrule support plug 16 or closure plug 18 by means of a bayonet fitting rather than a threaded fitting. One of the two opposed bayonet type recesses in each passage 10 can be seen at 36 in FIG. 7. In FIG. 8 the boss 20 of the ferrule support plug 16 is shown with projecting pins 38 to engage in the opposed recesses 36. FIG. 9 shows the corresponding arrangement for the closure plug 18. The bayonet type engagement of the ferrule support plug and closure plug with the module is preferred to the screw threaded engagement, as engagement and release can be accomplished more quickly while still achieving a secure connection.

FIG. 7 also shows the use of optional back big plates 39a, 39b applicable to the open rear face of each module 2 and end cap 8 to ensure that concrete cannot flow into the interior of the module by passage between the module and the slip form.

The embodiment has been described by way of example only and modifications are possible within the scope of the invention. For example the passages 10 may be blind passages opening only onto the inner face of the module, with separate passages being provided for fasteners to attach the module to the slip form. Although the modular construction is particularly preferred for the reasons discussed, nevertheless it is within the scope of the invention for the rebate form to be produced in a range of different lengths with the appropriate length being chosen to suit the desired application. Although it is preferred for the rebate form to be produced with a series of passages only some of which will be selected for use, with the remainder being closed by the application of closure plugs, that is not essential and it is possible for the form to be produced just with sufficient passages for a particular use. Although it is preferred to attach the ferrule support fingers by a bayonet fitting or screw fitting into the passage in the rebate formwork, an alternative method of releasable attachment could alternatively be used.

Figure 10:
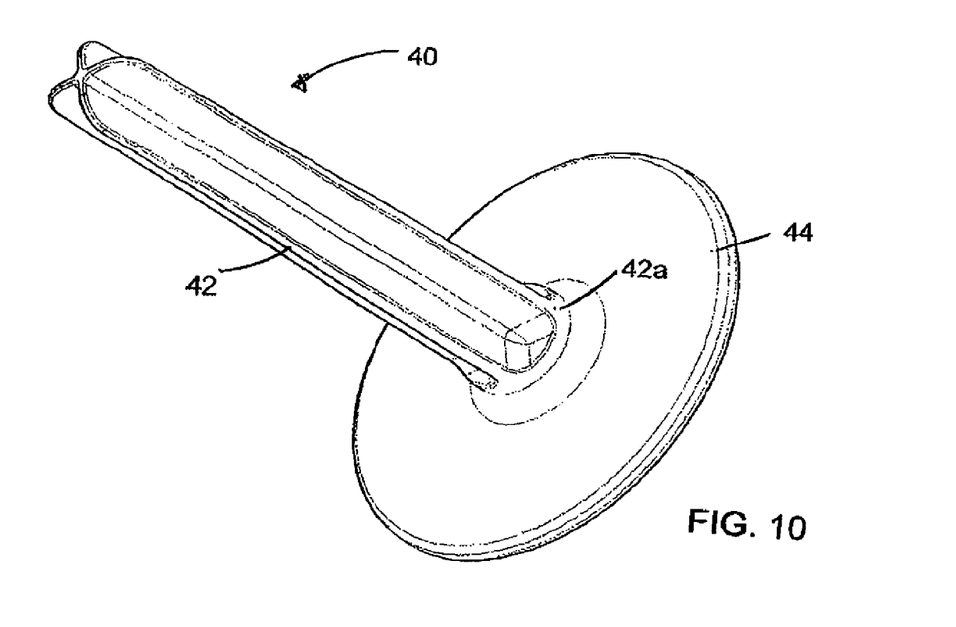
FIG. 10 shows a ferrule support designed for use in other casting situations.
Figure 11:
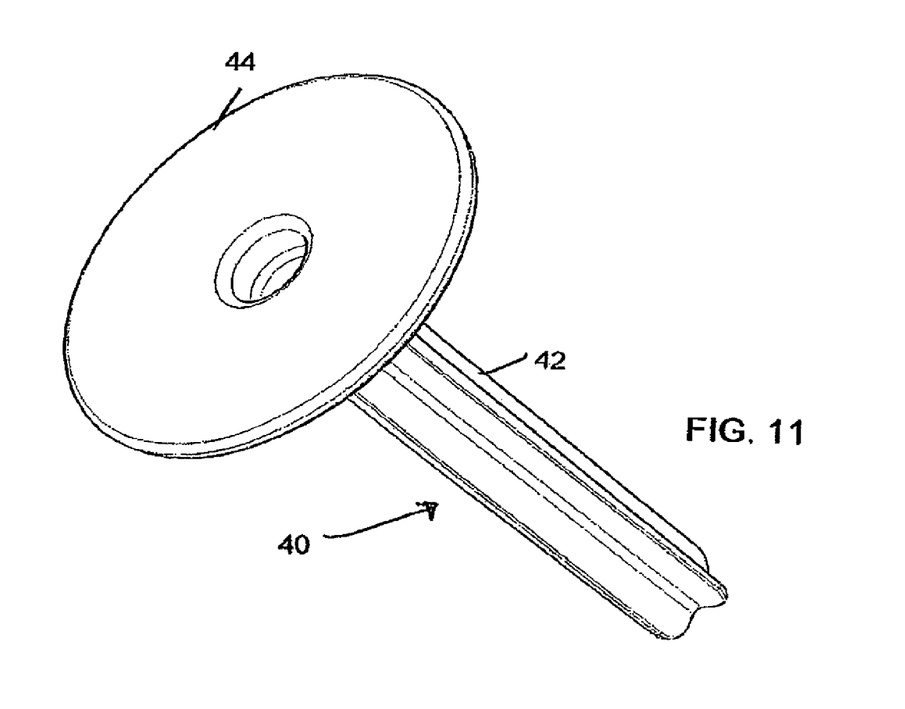
FIG. 11 is a rear perspective view of the support of FIG. 10.

The ferrule support plugs 16 which form part of the formwork system will, in a somewhat redesigned form, have broader applicability. FIGS. 10 and 11 show a female support 40 with a ferrule support finger 42 which corresponds to the ferrule support finger 28 of the plug 16 as previously discussed in detail. In this version of the support, the head 44 of the support is of disc-like form with a substantially plane rear surface whereby the head can be attached directly to formwork either by nailing through the head or by adhesive. As for the support plug 16, the part 42a of the support finger immediately adjacent the head 44 is sized to be a firm push fit within the outer end of the ferrule passage so as to engage and seal the end of the passage and the remainder of the finger is of a cross-section which engages the internal surface of the ferrule along substantially its entire length to provide support for the ferrule but without providing significant resistance to insertion or removal of the finger into and out of the ferrule. The support provided by the finger 42 is such that during the concrete pour, the ferrule will not be pushed off the support which is a problem with certain existing ferrule supports which push onto the ferrule. Although the substantive part of the support finger 42 (and also the support finger 28) is shown to be of cruciform section, other configurations which provide support but without providing significant resistance to insertion or removal of the finger, could alternatively be provided.

Throughout this specification and claims which follow, unless the context requires otherwise, the word "comprise" and variations such as "comprises" or "comprising", will be understood to imply the inclusion of a stated integer or group of integers or steps but not the exclusion of any other integer or group of integers.

The invention claimed is:

1. A method of forming a rebate in a surface of a slip cast core with at least one cast-in ferrule opening into the rebate for receiving a reinforcing or fastening element, said method using a formwork system,
   the formwork system comprising:
      a ferrule having an interior passage;
      a rebate form, and
      at least one ferrule support carried by the rebate form,
         wherein the ferrule support comprises a finger, the finger projects from an inner face of the rebate form and the finger is received within the interior passage of the ferrule to engage an internal surface of the interior passage of the ferrule to provide support for the ferrule along the interior passage of the ferrule during casting of the ferrule into the core; and
         wherein the finger is axially withdrawable from the interior passage of the ferrule after casting by a withdrawal of the rebate form from the core in an outward movement perpendicular to the face of the core thereby exposing an outer end of the ferrule which opens onto the rebate to receive a reinforcing or fastening element;
   said method comprising:
      attaching the rebate form to a slip form or reinforcement, with the ferrule support carried by the rebate form;

pushing the at least one ferrule onto the finger of the ferrule support so that the finger is received within the interior passage of the ferrule to engage the internal surface of the interior passage of the ferrule;

casting the ferrule into the core with the finger providing support for the ferrule along the interior passage of the ferrule during said casting; and after said casting, withdrawing the rebate form from the core in an outward movement perpendicular to the surface of the core, thereby exposing the outer end of the ferrule which opens onto the rebate to receive the reinforcing or fastening element, wherein said withdrawing axially removes the finger from the interior passage of the ferrule without destroying the ferrule support.

2. A formwork system for forming a rebate in a face of a core produced by slip form casting, said system comprising:
a ferrule having an interior passage;
a rebate form, and
at least one ferrule support carried by the rebate form;
wherein the ferrule support comprises a finger, the finger projects from an inner face of the rebate form and the finger is receivable within the interior passage of the ferrule to engage an internal surface of the interior passage of the ferrule to provide support for the ferrule along the interior passage of the ferrule during casting of the ferrule into the core; and
wherein the finger is axially withdrawable from the interior passage of the ferrule after casting, thereby exposing an outer end of the ferrule which opens onto the rebate to receive a reinforcing or fastening element;
wherein the finger of the ferrule support is push fit within the interior passage of the ferrule to retain the ferrule during casting and to retain the outer end of the ferrule substantially flush with the inner face of the rebate form.

3. A system according to claim 2, wherein the rebate form has means for mounting the at least one ferrule support at selected positions along a length of the rebate form.

4. A system according to claim 2, wherein
the rebate form has a series of spaced passages opening to the inner face of the rebate form, and
the series of spaced passages have either the ferrule support, or a closure plug selectively and releasably applied thereto.

5. A system according to claim 4, wherein the system comprises multiple said rebate forms each of which is of modular construction enabling a rebate of required length to be produced by assembling two or more said rebate forms in end-to-end relation.

6. A system according to claim 5, wherein each said rebate form has interlocking end fittings configured for interlocking engagement with the end fittings of adjacent said rebate forms.

7. A formwork system for forming a rebate in a face of a core produced by slip form casting, said system comprising:
a ferrule having an interior passage;
a rebate form, and
at least one ferrule support carried by the rebate form;
wherein
the ferrule support comprises a finger, the finger projects from an inner face of the rebate form and the finger is receivable within the interior passage of the ferrule to engage an internal surface of the interior passage of the ferrule to provide support for the ferrule along the interior passage of the ferrule during casting of the ferrule into the core;

the finger is axially withdrawable from the interior passage of the ferrule after casting, thereby exposing an outer end of the ferrule which opens onto the rebate form to receive a reinforcing or fastening element;

the rebate form has a series of spaced passages opening to the inner face of the rebate form;

the series of spaced passages have either the ferrule support, or a closure plug selectively and releasably applied thereto;

the system comprises multiple said rebate forms each of which is of modular construction enabling a rebate of required length to be produced by assembling two or more said rebate forms in end-to-end relation; and each said rebate form has interlocking end fittings configured for interlocking engagement with the end fittings of adjacent said rebate forms.

8. A formwork system for forming a rebate in a face of a core produced by slip form casting, said system comprising:
a ferrule having an interior passage;
a rebate form, and
at least one ferrule support carried by the rebate form,
wherein the ferrule support comprises a finger, the finger projects from an inner face of the rebate form and the finger is received within the interior passage of the ferrule to engage an internal surface of the interior passage of the ferrule to provide support for the ferrule along the interior passage of the ferrule during casting of the ferrule into the core; and
wherein the finger is axially withdrawable from the interior passage of the ferrule after casting by a withdrawal of the rebate form from the core in an outward movement perpendicular to the face of the core, thereby exposing an outer end of the ferrule which opens onto the rebate to receive a reinforcing or fastening element.

9. A system according to claim 8, wherein the rebate form includes means for mounting the at least one ferrule support at selected positions along a length of the rebate form.

10. A system according to claim 8, wherein the rebate form has a series of spaced passages opening to the inner face of the rebate form, the spaced passages configured to selectively and releasably engage the ferrule support,
the system further comprising a closure plug to be applied to each passage not engaging the ferrule support.

11. A system according to claim 10, wherein the system comprises multiple said rebate forms each of which is of modular construction enabling a rebate of required length to be produced by assembling two or more said rebate forms in end-to-end relation.

12. A formwork system for forming a rebate in a face of a core produced by slip form casting, said system comprising:
a rebate form having at least one passage which has an opening on an inner surface of the rebate form; and
at least one ferrule support having a boss, a finger, and a head between the boss and the finger,
wherein
the boss is receivable in and releasably engageable with the passage to removably attach the ferrule support to the rebate form;
the finger is receivable within an interior passage of a ferrule to provide support for the ferrule during casting of the ferrule into the core, and is axially withdrawable from the interior passage of the ferrule after casting;
the head has an outer diameter greater than those of the boss and the finger; and
when the boss is engaged with the passage, the head closes the opening of the passage against entry of concrete during casting.

13. A system according to claim 12, wherein
the passage has, in order from the opening, an annular recess and a section engageable with the boss; and
when the boss is engaged with said section of the passage, the head is seated within the annular recess.

14. A system according to claim 13, wherein
when the boss is engaged with said section of the passage, the head is seated within the annular recess and flush with the inner surface of the rebate form.

15. A system according to claim 13, wherein
the boss and said section of the passage have matching threads or bayonet members for releasable engagement with each other.

16. A system according to claim 12, wherein the passage has, in order from the opening,
a first section of a larger diameter and engageable with the boss; and
a second section of a smaller diameter for receiving a fastener inserted into the passage for fastening the rebate form to a front face of a slip form.

17. A system according to claim 12, wherein the finger has, in order from the head,
a first section of a larger diameter and adapted to be push-fit within an outer end of the interior passage of the ferrule so as to engage and seal the outer end of the interior passage of the ferrule; and
a second section of a smaller diameter and adapted to engage an internal surface of the interior passage of the ferrule without providing significant resistance to insertion or removal of the finger into and out of the ferrule.

18. A system according to claim 12, further comprising
a closure plug having a head and a boss;
wherein
the boss of the plug is receivable in and releasably engageable with the passage to removably closing the passage when the ferrule support is not attached to said passage;
the head of the plug has an outer diameter greater than that of the boss of the plug; and
when the boss of the plug is engaged with the passage, the head of the plug closes the opening of the passage against entry of concrete during casting.

19. A system according to claim 18, wherein
the head of the plug has a slot for engagement with a tool.

* * * * *